(12) United States Patent
Stadler

(10) Patent No.: US 10,960,246 B2
(45) Date of Patent: Mar. 30, 2021

(54) METHOD FOR RESPONDING TO A FIRE-CRITICAL BATTERY STATE IN A VEHICLE, AND A VEHICLE DESIGNED TO CARRY OUT SUCH A METHOD

(71) Applicant: AUDI AG, Ingolstadt (DE)

(72) Inventor: Michael Stadler, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/549,058

(22) Filed: Aug. 23, 2019

(65) Prior Publication Data
US 2020/0086152 A1    Mar. 19, 2020

(30) Foreign Application Priority Data
Sep. 14, 2018   (DE) .......................... 102018215708.1

(51) Int. Cl.
| | |
|---|---|
| A62C 3/07 | (2006.01) |
| B60Q 1/46 | (2006.01) |
| E05F 1/00 | (2006.01) |
| E05F 15/72 | (2015.01) |
| H01M 10/48 | (2006.01) |

(Continued)

(52) U.S. Cl.
CPC ................ *A62C 3/07* (2013.01); *B60Q 1/46* (2013.01); *E05F 1/006* (2013.01); *E05F 15/72* (2015.01); *H01M 10/486* (2013.01); *H01M 50/24* (2021.01); *H01M 50/30* (2021.01)

(58) Field of Classification Search
CPC . A62C 3/07; E05F 15/72; E05F 1/006; B60Q 1/46; H01M 2/1094; H01M 2/12; H01M 10/486

USPC ..................................................... 340/286.05
See application file for complete search history.

(56) References Cited

U.S. PATENT DOCUMENTS

2010/0323228 A1* 12/2010 Okamoto ............ H01M 2/1235
                                                                    429/82
2013/0337296 A1* 12/2013 Cardoso .................. B60L 58/26
                                                                    429/61

(Continued)

FOREIGN PATENT DOCUMENTS

DE            60118293 T2    12/2006
DE         102008034700    *  1/2010

(Continued)

OTHER PUBLICATIONS

Examination Report dated May 8, 2019 in corresponding German application No. 102018215708.1; 24 pages.

*Primary Examiner* — Omar Casillashernandez
(74) *Attorney, Agent, or Firm* — Maier & Maier, PLLC

(57) ABSTRACT

A method for responding to a fire-critical battery state in a motor vehicle having at least one battery, and a motor vehicle designed to carry out such a method. A battery temperature of the at least one battery of the motor vehicle is continuously detected by at least one temperature sensor. The method includes the following steps: Continuous detection of a temperature change in the battery based on the continuously detected battery temperature; verifying whether the detected temperature change exceeds a specified threshold defining a fire-critical battery state; and activating at least one vehicle function in order to perform a protective and/or warning measure by a control unit, if the fire-critical battery state is reached.

6 Claims, 1 Drawing Sheet

(51) Int. Cl.
*H01M 50/24* (2021.01)
*H01M 50/30* (2021.01)

(56) References Cited

U.S. PATENT DOCUMENTS

| | | | | |
|---|---|---|---|---|
| 2015/0132616 A1* | 5/2015 | Sahner | ............... | H01M 10/4257 |
| | | | | 429/50 |
| 2016/0104920 A1* | 4/2016 | Eifert | ...................... | B60L 58/18 |
| | | | | 320/153 |
| 2017/0226921 A1* | 8/2017 | Aggstaller | .......... | F16K 37/0091 |
| 2019/0296407 A1* | 9/2019 | Newman | ............. | H01M 10/617 |

FOREIGN PATENT DOCUMENTS

| | | |
|---|---|---|
| DE | 102008034700 A1 | 1/2010 |
| DE | 102012207152 A1 | 10/2013 |
| DE | 102016119144 A1 | 4/2017 |
| DE | 202017103777 U1 | 7/2017 |

* cited by examiner

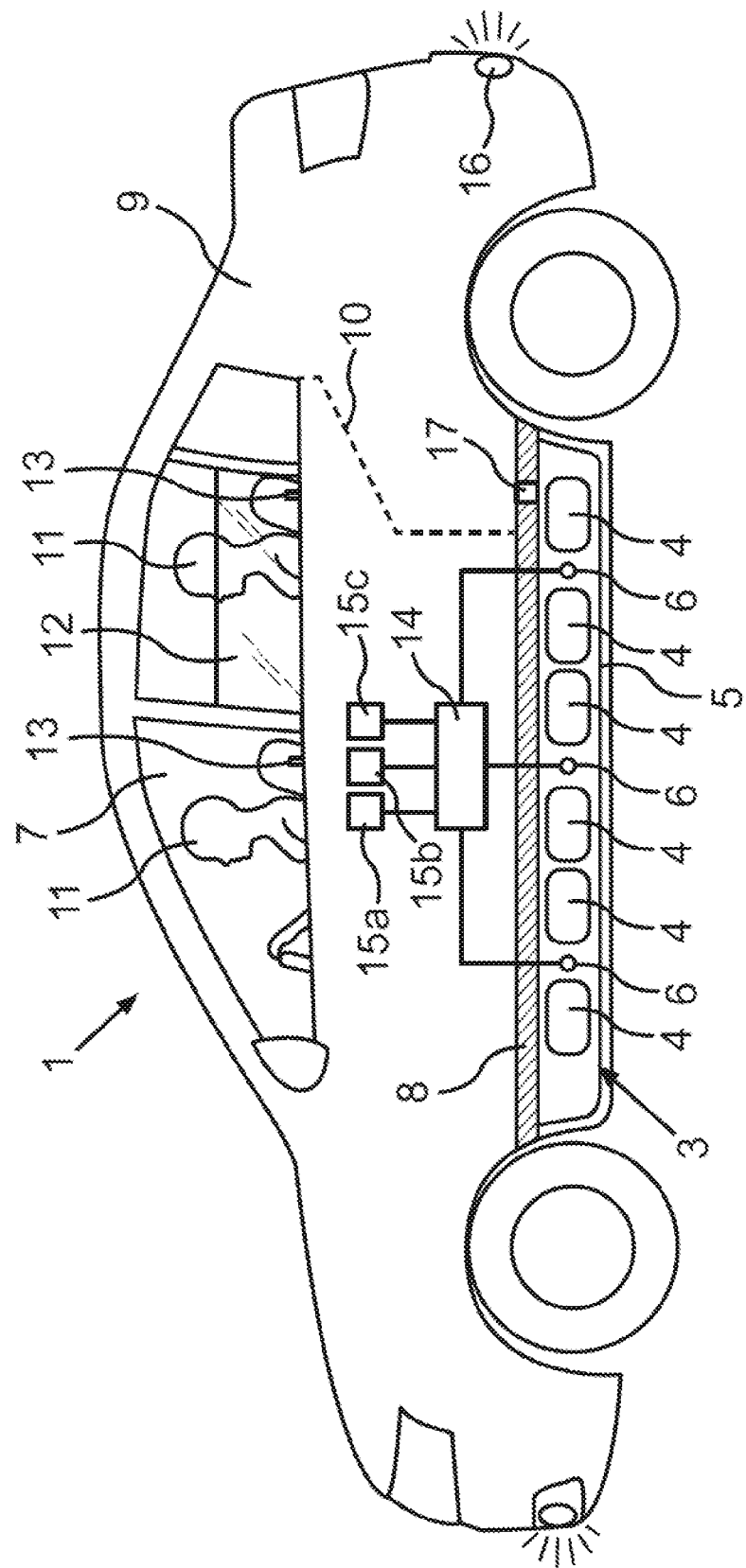

METHOD FOR RESPONDING TO A FIRE-CRITICAL BATTERY STATE IN A VEHICLE, AND A VEHICLE DESIGNED TO CARRY OUT SUCH A METHOD

FIELD

The invention relates to a method for responding to a fire-critical battery state in a vehicle having at least one battery, and a vehicle designed to carry out such a method.

BACKGROUND

A relevant current research objective is to develop electrically powered vehicles, such that they are at least as safe as conventionally powered vehicles. However, in conventional electrically powered vehicles, there is a certain risk of vehicle fire due to damage to the battery, which is designed to operate the electrically powered vehicles. The rate of fire propagation in such a vehicle fire, e.g., due to a traction battery based on lithium-ion technology catching fire, may in certain circumstances be greater than with battery fires in conventionally powered vehicles.

Today's safety concepts for electrically powered vehicles are mainly focused on ways to avoid a fire, or on relatively simple warning functions.

DE 20 2017 103 777 U1 describes a monitoring and warning device for drive battery failures, with which individual battery cells connected in series and in parallel in a traction battery pack can be monitored for thermal failures. This takes into account, among other things, that if a battery cell of a battery module is disturbed during operation, the surface battery temperature cell changes, thereby causing a sharp increase in the electrical resistance in the battery and its temperature. Such a temperature increase is determined by means of an increased potential difference at the corners of a Wheatstone bridge forming part of the monitoring and warning device. The monitoring and warning device include a temperature sensor that directly monitors the surface temperature of the individual battery cells of the battery module.

DE 601 18 293 T2 describes a device and a method for monitoring the electrical energy in a motor vehicle. A battery temperature sensor and a battery temperature detection circuit are used, among other things, to detect the battery temperature and taking it into account, when calculating the available battery power. Based on the calculated available battery power, the warning value is eventually modified in order to keep the battery from overcharging.

DE 10 2016 119 144 A1 describes an electrical system for a motor vehicle. This electrical system includes, among other things, several vehicle batteries and a temperature sensor for detecting a battery temperature. Permissible operating times and/or permissible minimum voltages of the battery can be determined at least partially on the basis of the detected temperature.

SUMMARY

It is the object of the invention to provide a solution making it possible to respond particularly quickly and early on to a fire-critical battery state of a vehicle.

This object is achieved by a method of responding to a fire-critical battery state in a vehicle having at least one battery, as well as by a vehicle designed to carry out such a method in accordance with the independent claims. Advantageous embodiments with functional and non-trivial developments of the invention are described in the dependent claims.

The method according to the invention for responding to a fire-critical battery state in a vehicle having at least one battery, in which a battery temperature is continuously detected by at least one temperature sensor, is characterized by the following steps: continuous determination of a change in battery temperature based on the continuously detected battery temperature; verifying whether the determined temperature change exceeds a specified threshold, which defines a fire-critical battery state; activation of at least one vehicle function for performing a protective and/or warning measure by means of a control unit, if the fire-critical battery state is reached.

The invention is based on the realization that measures for instructing the driver and protecting the occupants of a vehicle in a fire situation can help reduce the risk for the driver and the occupants of the vehicle. However, this can only be achieved, if provided with sufficient and useful instructions on how to behave in such a situation. The reliability of the driver and occupant warning is thus a particularly important concern in terms of the advantageous reaction of the persons involved, but also in terms of automatically controllable vehicle functions in a fire-critical situation.

The method according to the invention is based on the fact that in a vehicle battery, which is designed, e.g., as a traction battery with several interconnected battery elements, the battery temperature is repeatedly determined by at least one temperature sensor designed for this purpose. Based on the thus provided several battery temperature readings, the chronological sequence of the battery temperature can be determined. This chronological sequence therefore describes the temperature change of the battery. The determined value for the temperature change is compared with a specified threshold. If the detected temperature change exceeds this specified threshold, the battery is assumed to be in a fire-critical state. In the following, it is therefore assumed that the determined fire-critical battery state has been reached, whenever the determined temperature change has exceeded the specified threshold. An actual battery fire need not have occurred yet in this state. However, a particularly rapid temperature increase, i.e., a particularly large temperature change, is an indication that there is a relatively high probability that the battery is about to reach a burning state, or is in fact already burning. If, for example, there is a relatively sharp rise in the temperature of the vehicle battery within a relatively short span of a few seconds, which [is determined] by a temperature sensor provided for this purpose and placed directly on the battery housing, this can be interpreted as an indication that the battery is in a fire-critical state.

Once it has been detected that the battery is in a fire-critical state, at least one vehicle function is activated by means of an appropriate vehicle control unit. This makes it possible to carry out specified measures to protect and warn the vehicle occupants, as well as other road users in the vicinity of the vehicle about the determined fire-critical situation in the vehicle. The thus performed protective measures include automatic closing of currently open vehicle windows in order to prevent smoke from the expected or already erupted battery fire from entering the interior through the open windows and endangering the health of the vehicle occupants. As a warning measure, a warning signal in the passenger compartment may, e.g., be visibly displayed for the driver and, if necessary, other vehicle occupants, or a warning sound may be emitted. This can be, e.g., a warning light, but also displaying a warning message and/or a warning symbol on a display device in the vehicle interior specifically designed for this purpose.

One advantage of the invention is that a fire-critical battery state is not solely recognized based on the detection of a vehicle accident, as is currently often the case. Crash sensors in the doors and front and rear areas of the vehicle are therefore not used to detect any deformation of the vehicle body and/or deceleration of the vehicle is also not detected by sensors designed for this purpose, which would suggest an accident of the vehicle and an increased risk of battery fire. Instead, a particularly rapid temperature change in the area of the vehicle battery is used to detect that a battery fire is likely to occur in the near future. Battery fires do not only occur during vehicle accidents, but can also occur relatively spontaneously, e.g., due to impurities in the battery material during battery production. This may produce, e.g., a short circuit in the battery at any time after the battery has been put into operation, and subsequently, a battery fire. Battery obsolescence may also induce spontaneous battery fires. It is therefore possible for the battery to be in a fire-critical state, even though no external damage has occurred, or the damage occurred relatively long ago. The method according to the invention therefore allows for continuous temperature measurements at the battery in order to detect a fire-critical battery state, and is therefore also suitable for responding to spontaneously occurring battery fires.

Moreover, as for the detection of the fire-critical battery state, the method according to the invention is not based on the detection of a temperature simply exceeding the threshold. The reason is that the determined battery temperature change represents a measured value making it possible to determine whether a temperature development in the battery is an indication of a fire-critical battery state and much earlier than based on a simple temperature threshold. The threshold of the temperature changes can also be clearly distinguished based on, e.g., temperature changes as a result of battery power dissipation due to vehicle acceleration.

The moment an unusually high temperature change, which exceeds the specified threshold is determined, a very high probability that a fire will occur or that a fire has already erupted in the battery can be assumed. By evaluating the temperature change in the battery in this way, a potential battery fire can be detected particularly rapidly and early on allowing for measures to be taken particularly promptly and early on in order to protect and/or warn the occupants in the vehicle and other persons in the vicinity. The method thus allows for a particularly advantageous response to a fire-critical battery state in a vehicle.

In order to detect the fire-critical battery state with particularly high reliability, it is advantageous, if the battery temperature is detected by several temperature sensors, whereby the fire-critical battery state can be detected in a particularly reliable fashion, even if one or more temperature sensors should fail, or an incorrect temperature-sensor measurement was made.

In addition to the method steps described above, it may be useful if design measures are already installed in the vehicle, in order to delay the eruption of a fire at elevated battery temperatures. For example, a fire protection layer arranged between the battery and the vehicle interior is suited for this purpose. Such a fire-protection layer consisting of fire- and heat-resistant materials may be used to ensure the implementation of protective or warning measures at an early stage, in that the fire protection layer delays the time, at which the occupants are actually at risk, in spite of the fire-critical battery state having already been reached and detected. Thus, seconds to minutes may be gained in order to respond to the fire-critical battery state by carrying out protective and/or warning measures. Responding to a fire-critical state is therefore possible at an early stage, thereby reducing the risk to the vehicle occupants of a battery fire.

A further advantageous embodiment of the invention provides for at least one of the following measures to be implemented in the vehicle, as a precaution: Activating the safety mode of the air conditioning system by deactivating it or operating it in a non-ventilation recirculation mode, unlocking the door, automatically closing opened vehicle windows and, in particular, a vehicle moonroof, interrupting the power supply of an electric drive unit of the vehicle. All these protective measures are aimed at protecting the occupants of the vehicle against the effects of a fire-critical battery state and, in particular, the battery fire to be expected.

Activating the safety mode of the air-conditioning system makes is possible, e.g., to ensure that the ventilation of the vehicle is operated in so-called recirculation mode, whereby no air from the vehicle environment containing, e.g., flue gases from the battery fire already in progress, is directed into the vehicle. Alternatively, the air conditioning system, i.e., the fan of the air conditioning system, may be switched off. These measures are particularly useful, when the vehicle is stationary so as to prevent smoke from the battery fire from entering the vehicle interior, where it might endanger the health of the vehicle occupants. This measure can be implemented, e.g., by sending an appropriate signal via a CAN connection, a Flexray connection, or using other networking technologies in the vehicle, from the control unit to a corresponding climate control unit. These specific actions, as described, are then carried out by the climate control unit itself.

A further additional or alternative protective measure involves unlocking the vehicle doors having been locked, e.g., by an automatic door-lock system, while the vehicle is in motion, upon detection of the fire-critical battery state.

This allows the occupants to leave the vehicle particularly swiftly, and also for people in the vehicle environment and persons responsible for rescuing the occupants to reach the vehicle occupants particularly swiftly, e.g., in order to rescue them from the burning vehicle. Thus, a corresponding control signal is sent from the control unit via the signal transmission devices designed for this purpose to a door control unit or a comfort control unit designed to activate the door locking system of the motor vehicle.

If, upon reaching the fire-critical battery state, the vehicle windows and/or roofing system are open, they will similarly now be closed by corresponding signals transmitted via the above signal transmission devices to the vehicle comfort control units designed for this purpose. This also prevents passage of smoke from the battery fire through the vehicle window opening or through the moonroof into the vehicle interior.

Furthermore, and as a protective measure, continued control of the manual or automatic propulsion of the vehicle, i.e., the electric power train of the vehicle, can be prevented. The rationale is that the risk of fire in a fire-critical battery state is increased by an additional electrical load on the vehicle's battery, especially in electrically powered vehicles. For this reason, appropriate control signals are sent to an engine control unit via the above signal transmission devices, thereby interrupting the power supply of the electric drive unit of the motor vehicle. The above-described measures are thus intended to protect the occupants in the event of a fire-critical battery state, i.e., against the development of smoke associated with a battery fire and in terms of evacuating the vehicle occupants, as well as against a further increase in the fire risk due to continued operation of the affected vehicle battery.

As an alternative or additional protective measure, the cooling capacity of the battery may be maximized. This may prevent, e.g., a so-called thermal runaway in the battery. Hence, the fire can be delayed and maybe even prevented. For this purpose, corresponding control signals are transmitted from the control unit to the control unit of the battery cooling system via the above signal transmission devices.

Another particularly advantageous embodiment of the invention provides for the implementation of at least one of the following optional measures: Automatic activation of a hazard warning light, the transmission of an automatic emergency call to a specified coordination center, and the display of a warning signal in the vehicle interior.

If the fire-critical battery state is reached, the vehicle's hazard warning lights can thus be activated automatically, e.g., by transmitting corresponding signals to a corresponding comfort-control unit. This warning measures advises people in the vicinity of the vehicle that there is has a problem and that it may pose a danger. Alternatively or in addition, an automatic emergency call can be placed in order to contact rescue services and salvage crews, who may then, e.g., extinguish the battery fire, salvage the vehicle and/or rescue the vehicle occupants, if they are still inside the vehicle, when the rescue and salvage crews arrive. Such an automatic emergency call may be made, e.g., via a vehicle's E-Call system, an automatic emergency call system for vehicles prescribed by the European Union. Moreover, information and prompts may be transmitted to the driver and other occupants of the vehicle by means of an appropriate vehicle display device, such as a man-machine interface, and/or by means of acoustic signals. These alert the occupants that they need to leave the vehicle as quickly as possible due to the fire-critical battery state. For example, readable and/or audible messages may be output via a vehicle infotainment system, and/or a corresponding warning light may be activated in the vehicle interior. For this purpose, the appropriate control signals are transmitted via the above signal-transmission devices to a vehicle light control unit, the infotainment system, a combination control unit, or an E-Call control unit.

Hence, several measures are provided with which the occupants of the motor vehicle can be informed promptly and early on about a fire-critical battery state. Furthermore, other users sharing the road and persons in the vicinity of the vehicle can be warned, and assistance can be called in by informing the appropriate emergency control center.

A further advantageous embodiment of the invention makes it possible to verify whether the continuously detected battery temperature exceeds a specified threshold temperature defining the fire-critical battery state. In addition to verifying whether the determined temperature change exceeds a specified threshold, the system also detects whether an absolute threshold temperature is exceeded. This establishes a second criterion, which defines the fire-critical battery state, in order, e.g., to detect the fire-critical battery state reliably, even in the relatively unlikely event of a modest rise in battery temperature. After the threshold temperature has been exceeded due to a temperature rise in the battery, the described protective measure and/or warning measure are also carried out.

In a further advantageous embodiment of the invention, local battery temperatures are detected continuously by several temperature sensors, a spatial temperature gradient is determined based on the continuously detected battery temperature, and whether the determined spatial temperature gradient exceeds a specified gradient threshold, which defines a fire-critical battery state, is also checked. In addition to the above-described detection of the temperature change and the absolute battery temperature, the spatial temperature distribution based on the so-called spatial temperature gradient in the battery is taken into account as a third definition of the fire-critical battery state. This assumes the presence of a temperature sensor in the battery, as well as the arrangement of local temperature sensors at several locations, e.g., at different points inside the battery housing, which measure the local battery temperature. From these local temperature measurements, the spatial development of the temperature can be detected each time a measurement is made, and can be indicated, e.g., by means of a temperature gradient. In case of a noticeable temperature change only at a certain point in the battery, it can be detected by the appropriate temperature-change signal of the local temperature sensor, but also by means of the spatial temperature gradient. Thus, the spatial temperature gradient is taken into consideration in order to additionally ensure the reliability of the method, and a corresponding gradient threshold is established in order to define the fire-critical battery state.

According to the invention, a motor vehicle is also provided. This motor vehicle comprises a battery, at least one temperature sensor for continuous detection of a battery temperature, and a control unit for controlling at least one motor vehicle function. The control unit is designed to carry out a method, as described above. The preferred embodiments presented in connection with the method according to the invention and their advantages apply correspondingly, and where applicable, to the motor vehicle according to the invention. Thus, the motor vehicle has a safety system for the vehicle's own battery, which comprises at least the control unit and one temperature sensor.

A further advantageous embodiment of the motor vehicle according to the invention provides for a battery with several battery cells for supplying power to an electrical drive unit in the motor vehicle. The vehicle battery can therefore be designed as a battery module comprising several battery cells, e.g., as a traction battery based on lithium-ion technology, with which, e.g., an electric motor of the motor vehicle may be operated. Particularly in the case of a battery having several battery cells, the installation of several temperature sensors at different points within the battery is advantageous in order to detect the temperature, including the temperature changes within the battery differentiated locally and in a particularly reliable fashion.

A further embodiment of the motor vehicle according to the invention provides that a fire protection layer be arranged between the battery and the vehicle interior. This fire protection layer may be, e.g., a fire protection mat or a fire-retardant material, such as a multi-layer polymer-metal laminate system, a so-called multi-layer polymer laminate (PML) system. Such a material is made up of several laminar layers, which increase as the material is heated. This gives rise to cavities in the material, which impairs a temperature transfer in the material, i.e., the thermal conductivity of the material. The application of such a fire protection layer between the battery and the vehicle interior can thus prevent or at least delay the spread of the fire into the interior accommodating the occupants. This translates into a time gain for the vehicle occupants of several seconds to minutes, in which the protective or warning measures may be carried out. Thus, the fire protection layer may aid the process of responding to a fire-critical battery state, allowing for more time to complete the steps identified by the method.

In a further embodiment of the vehicle according to the invention, the battery is enclosed by a battery housing, which has a degassing vent at a location not facing the vehicle interior or an exit and entry area intended for the vehicle occupants. Such a degassing vent may be arranged, e.g., at a rear portion of the battery adjacent to the vehicle trunk. Alternatively, the degassing vent may be arranged on the vehicle underside. The degassing vent is an opening in a prismatic battery cell or a battery cell designed as a circular cell, which automatically opens in the event of overpressure. In the event of a battery fire, the battery electrolyte, which meanwhile has developed into gaseous form, can escape through this opening. In addition or as an alternative to a degassing vent, a degassing channel may also be provided in order to alleviate overpressure in the battery and thus delay the spread of fire.

In a further advantageous embodiment of the vehicle according to the invention, the battery housing has a burst opening at a location not facing the vehicle interior, or the exit and entry area of the vehicle occupants. A burst opening is, e.g., a point on the battery housing, which yields particularly early in the event of battery overpressure, whereby the overpressure may be reduced. As a result, the exit point of the overpressure and the associated or possibly resulting battery fire will be situated at a location in the vehicle, where there are no vehicle occupants, e.g., the trunk.

For example, it is particularly advantageous to position the degassing vent or the burst opening as far as possible below the vehicle or in the front or rear thereof. However, degassing on a hot surface, such as an exhaust system in so-called plug-in hybrid vehicles should be avoided. However, when positioning the degassing vent and the burst opening, care must be taken to ensure that the exit and entry areas for the vehicle occupants are not affected and endangered by the emerging gas and the flames occurring there. This makes it particularly safe for the vehicle occupants to leave the vehicle in the event of a fire-critical battery state.

The invention also includes combinations of the functions of the described embodiments.

The invention also includes developments of the method according to the invention with the functions described above as part of developments of the vehicle according to the invention. For this reason, the corresponding developments of the method according to the invention will not be described again.

BRIEF DESCRIPTION OF THE DRAWING

Below follows a description of an embodiment of the invention. For this purpose, the FIGURE shows a schematic representation of a vehicle with a battery, which is in a fire-critical battery state.

DETAILED DESCRIPTION

The exemplary embodiment explained below represents a preferred embodiment of the invention. In the exemplary embodiment, each of the described components of the embodiment represents individual functions of the invention, which should be considered independently of one another, and which further develop the invention independently of one another. Therefore, the disclosure should include combinations of functions of the embodiment in addition to those described. Furthermore, the described embodiment may also be supplemented by already described additional functions of the invention.

In the FIGURE, identical reference numerals denote functionally equivalent elements.

In the one FIGURE, a motor vehicle 1 is outlined, i.e., a battery 3 designed to supply power to an electric drive unit (not shown) of the vehicle 1. The battery 3 shown here is, e.g., a so-called traction battery based on lithium-ion technology, i.e., battery 3 comprises several battery cells 4 and a battery housing 5. Several temperature sensors 6 are arranged within the battery housing 5, each of which detects a battery temperature on a continuous basis.

A fire protection layer 8 is arranged between the battery case 5 and the vehicle interior 7. This fire protection layer 8 is, e.g., a fire protection mat or other fire-retardant material. The vehicle interior 7 is also separated by means of a dividing wall 10 from the trunk 9 of the motor vehicle 1.

There are two occupants 11 in motor vehicle 1. When actually driving the motor vehicle 1, one of the vehicle 1 windows 12 is half open and an automatic door lock has locked the door locks 13 of motor vehicle 1. For automatic control of the vehicle windows 12 and the door locks 13, the motor vehicle 1 comprises a window control 15a and a door locking system 15b. A vehicle light control unit 15c is outlined here as a further vehicle function 15. The three mentioned vehicle functions 15a, 15b, 15c are designed to be controlled by a control unit 14 of the vehicle 1. Here, the vehicle light control unit 15c is especially designed to activate the vehicle lights of motor vehicle 1 as hazard warning lights 16.

The control unit 14 continuously determines a temperature change of battery 3 based on the continuously detected battery temperature. Thus, the change of the battery 3 temperature over time is repeatedly detected. The control unit 14 then verifies whether the determined temperature change exceeds a specified threshold, which defines a fire-critical battery state. Alternatively or in addition to the determined temperature change, the continuously detected battery temperature itself may also be adjusted with a preset threshold temperature. Alternatively or in addition, a spatial temperature gradient may be continuously detected by using the local battery temperatures as determined by several temperature sensors 6. This spatial temperature gradient may be compared with a specified gradient threshold.

The fire-critical battery state is also reached, when the continuously detected battery temperature exceeds the specified threshold temperature and/or the spatially determined temperature gradient exceeds the specified gradient threshold. The fire-critical battery state is thus defined on the basis of a remarkably large temperature change and/or an increased battery temperature and/or an increased spatial temperature gradient.

If the fire-critical battery state has been reached, at least one of the vehicle functions 15 is activated in order to carry out a protective measure or a warning measure. This activation of the vehicle functions 15 is done by means of control unit 14.

As a protective measure, automatic unlocking the door locks 13 of the motor vehicle 1 may, for example, take place. Thus, a corresponding control command is transmitted to the door locking system 15b via control unit 14. This enables the occupants 11 to escape from vehicle 1 and facilitates recovery of the occupants 11 of vehicle 1 by called-in rescue and salvage personnel.

As a further protective measure, automatic closing of the open vehicle window 12 may also take place via appropriate control commands from control unit 14 to the window control 15a. Further possible protective measures include activating the safety mode of an air conditioning system by deactivating the air-conditioning system or operating it in recirculation mode without ventilation function, or interrupting the power supply of the electric drive unit of motor vehicle 1.

In addition to the two aforementioned protective measures, a warning measure is also carried out in this example. For this purpose, a corresponding control signal is transmitted from the control unit 14 to the vehicle light control unit 15c, which then activates the hazard warning lights 16 of motor vehicle 1. Alternatively or in addition, an automatic emergency call may be placed to a specified control center or a warning signal may be displayed in the vehicle interior 7, which, e.g., alerts the occupants 11 to leave vehicle 1 as quickly as possible if the battery 3 of vehicle 1 is in a fire-critical battery state.

In addition or as an alternative to the fire protection layer 8, which may slow down or even prevent the development of a fire in the vehicle interior 7 as a result of a fire of the battery 3, the battery 3 has a degassing vent 17. The degassing vent 17 is located at a point in the battery 3 not facing the vehicle interior 7, but the trunk 9. If excess pressure in the battery 3 is reduced and/or flames and smoke escape through this degassing vent 17, this will not occur in the direction of the area of the motor vehicle 1, wherein the occupants 11 are located, but in the direction of the trunk 9, which may be loaded only with luggage, which further increases the protection of the occupants 11 to the extent possible.

Alternatively or in addition to the degassing vent 17, a burst opening may be provided at the point of the battery 3 not facing the vehicle inferior 7.

Generally, the example shows how for motor vehicle 1, a method for responding to a fire-critical battery state in vehicle 1 with at least one battery 3 can be carried out. In this case, occupants 11 of the motor vehicle 1 are informed about a fire-critical state in battery 3, i.e., warned with the aid of warning measures, whereupon measures to protect the occupants 11 are initiated.

The invention claimed is:

1. A method for responding to a fire-critical battery state in a motor vehicle having at least one battery, wherein a battery temperature is continuously detected by at least one temperature sensor, comprising the following steps:
continuously detecting of a temperature change of the battery based on the continuously detected battery temperature;
verifying whether the detected temperature change exceeds a specified threshold defining a fire-critical battery state;
actuating at least one vehicle function for carrying out a protective measure and/or warning measure by a control device, if the fire-critical battery state is reached; wherein the battery is enclosed by a battery housing, which has a degassing vent at a location leading into a trunk of the vehicle, and a burst opening with an exit point outside an area of a passenger occupancy area of the vehicle
wherein, as the protective measure, the following measures are carried out in the vehicle:
activating a safety mode of an air conditioner by deactivating the air conditioner or operating the air conditioner in recirculation mode without ventilation function;
door release;
automatic closing of opened vehicle windows and or of an opened vehicle moonroof; and
interrupting a power supply for an electric drive unit of the motor vehicle; and
wherein the following measures are carried out as the warning measure:
automatically activating a hazard warning light; and
placing an automatic emergency call to a specified control center;
displaying a warning signal in the vehicle interior.

2. The method according to claim 1, wherein, checking whether the continuously detected battery temperature exceeds a specified threshold temperature, which defines the fire-critical battery state.

3. The method according to claim 1, wherein local battery temperatures are continuously detected by several temperature sensors, a spatial temperature gradient is determined on the basis of the continuously detected battery temperatures, and checking whether the determined spatial temperature gradient exceeds a specified gradient threshold, which defines the fire-critical battery state.

4. A motor vehicle comprising:
a battery, at least one temperature sensor for continuously detecting a battery temperature and a control device for actuating at least one vehicle function of the motor vehicle, wherein the control device is designed to carry out a method according to claim 1.

5. The motor vehicle according to claim 4, wherein the battery has several battery cells and is designed to supply power to an electrical drive unit of the motor vehicle.

6. The motor vehicle according to claim 4, wherein a fire protection layer is arranged between the battery and the vehicle interior.

\* \* \* \* \*